(12) United States Patent
Marstall et al.

(10) Patent No.: US 8,290,641 B2
(45) Date of Patent: Oct. 16, 2012

(54) AIRCRAFT ATTITUDE SYSTEMS AND RELATED METHODS

(75) Inventors: Jerry Lee Marstall, Asheville, NC (US); Shakeel Mozaffar, Ocala, FL (US)

(73) Assignee: Pilot Disorientation Prevention Technologies, L.L.C., Dover, DE (US)

( * ) Notice: Subject to any disclaimer, the term of this patent is extended or adjusted under 35 U.S.C. 154(b) by 442 days.

(21) Appl. No.: 12/758,903

(22) Filed: Apr. 13, 2010

(65) Prior Publication Data

US 2011/0172855 A1 Jul. 14, 2011

Related U.S. Application Data

(60) Provisional application No. 61/171,103, filed on Apr. 21, 2009, provisional application No. 61/309,579, filed on Mar. 2, 2010.

(51) Int. Cl.
*G01C 5/00* (2006.01)
(52) U.S. Cl. .......................................................... 701/9
(58) Field of Classification Search .................. 709/9
See application file for complete search history.

(56) References Cited

U.S. PATENT DOCUMENTS

| 3,571,938 | A | 3/1971 | Branick |
| 3,852,710 | A | 12/1974 | Hernandez, Jr. |
| 4,044,059 | A | 8/1977 | Copelin |
| 4,193,059 | A | 3/1980 | Harris |
| D256,678 | S | 9/1980 | Schmidt |
| 5,095,746 | A * | 3/1992 | Stanis .................. 73/178 R |
| 6,405,107 | B1 | 6/2002 | Derman |
| 7,482,951 | B1 | 1/2009 | Brungart |

FOREIGN PATENT DOCUMENTS

| EP | 0116022 | 8/1984 |
| EP | 1470391 | 10/2004 |

OTHER PUBLICATIONS

English Abstract of EP1470391.

* cited by examiner

*Primary Examiner* — Thomas Tarcza
*Assistant Examiner* — Maceeh Anwari
(74) *Attorney, Agent, or Firm* — Thomas, Kayden, Horstemeyer & Risley, LLP.

(57) ABSTRACT

Aircraft attitude systems are provided. A representative aircraft attitude system includes: a detection system operative to determine an attitude of an aircraft in which the detection system is mounted; a warning system operative to alert a pilot when the attitude of the aircraft corresponds to at least one predefined attitude parameter from a set of predefined attitude parameters, the predefined attitude parameters including pitch, bank and yaw; and a recovery system operative to provide progressive flight control positioning directives to the pilot for returning the aircraft to a flight attitude within the predefined attitude parameters.

19 Claims, 8 Drawing Sheets

AIRCRAFT ATTITUDE SYSTEMS AND RELATED METHODS

CROSS-REFERENCE TO RELATED APPLICATIONS

This utility application claims the benefit of and priority to U.S. Provisional Patent applications 61/171,103, filed Apr. 21, 2009, and 61/309,579, filed Mar. 2, 2010, each of which is incorporated by reference herein in its entirety.

BACKGROUND

1. Technical Field

The present disclosure relates to aircraft safety systems.

2. Description of the Related Art

Throughout the history of flight, and continuing today, aircraft accidents occur as a result of pilots unknowingly permitting their aircraft to depart from an attitude of controlled flight and entering the regime of uncontrolled flight. Presently, there are three primary flight resources by which a pilot can determine an aircraft's flight attitude; 1) the visual horizon or physical surroundings, 2) an attitude indicator (not present in all aircraft), and 3) a turn and bank indicator (limited to bank indications only).

The pilot monitors these resources singularly or in combination to maintain and verify the flight attitude of the aircraft. Should pilot monitoring or the reliability of these resources be compromised, an aircraft's flight path can quickly deteriorate into a dangerous attitude that can result in the total loss of aircraft control and subsequent disaster. Even with present day sophisticated instruments, accidents still occur when pilots become disoriented or their attention is diverted away from aircraft attitude. Present day flight instruments represent "present" aircraft attitude. With the exception of the stall warning horn, they have no capability to warn of "pending" uncontrollable flight attitude. Even the stall warning system doesn't alert the pilot of the aircraft's attitude, only that the angle of attack is approaching the maximum angle that the wing will sustain aerodynamic lift.

The most prominent cause of inadvertent departure from controlled flight is spatial disorientation. Spatial disorientation can be defined quite simply as the inability to correctly orient oneself with respect to the earth's surface. Spatial disorientation in aviation occurs when an aircraft moves into an awkward and unsafe flying attitude without the pilot's awareness.

All pilots, student pilots to professional and military pilots, are susceptible to spatial disorientation. Federal Aviation Agency statistics indicate that 15-17% of all aviation accidents, which includes commercial airlines, are the result of spatial disorientation and 90% of these accidents are fatal. Spatial disorientation is the military's number one cause of fatal accidents.

Even the best of pilots will quickly become disoriented if they attempt to fly without instruments when there are no outside visual references. That's because vision provides the predominant sense we rely upon for spatial orientation. Therefore spatial disorientation most commonly occurs when the horizon or other outsides references are obscured, such as when clouds, haze, fog, snow or darkness are present. Loss of ability to determine the planes position via the horizon leads to disorientation and severe loss of flight control with potentially fatal results.

Instrument flight training instructs pilots in coping with spatial disorientation. However, an instrument rating does not make a pilot immune to spatial disorientation and its potential for disaster. Also, approximately 80% of the private pilots in the United States are not instrument rated. This does not stop some non-instrument rated pilots from continuing flight into conditions for which an instrument rating is required. According to the National Transportation Safety Board, 40% of the fatal general aviation accidents are because of this indiscretion. Current aviation accident statistics indicate that prior art continues to be insufficient to protect pilots from the hazards of spatial disorientation.

SUMMARY

Aircraft attitude systems are provided. In this regard, an exemplary embodiment of an aircraft attitude system comprises: a detection system operative to determine an attitude of an aircraft in which the detection system is mounted; a warning system operative to alert a pilot when the attitude of the aircraft corresponds to at least one predefined attitude parameter from a set of predefined attitude parameters, the predefined attitude parameters including pitch, bank and yaw; and a recovery system operative to provide progressive flight control positioning directives to the pilot for returning the aircraft to a flight attitude within the predefined attitude parameters.

Another exemplary embodiment of an aircraft attitude system for providing information to a pilot via an instrument panel of an aircraft, the instrument panel being operative to provide an artificial horizon and a flight director, comprises: a detection system operative to determine an attitude of the aircraft in which the detection system is mounted; a warning system operative to alert the pilot when the attitude of the aircraft corresponds to at least one predefined attitude parameter from a set of predefined attitude parameters, the predefined attitude parameters including pitch, bank and yaw; and a recovery system operative to display progressive flight control positioning directives to the pilot via the instrument panel for returning the aircraft to a flight attitude within the predefined attitude parameters.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DESCRIPTION OF THE PREFERRED EMBODIMENTS

Figure 1:
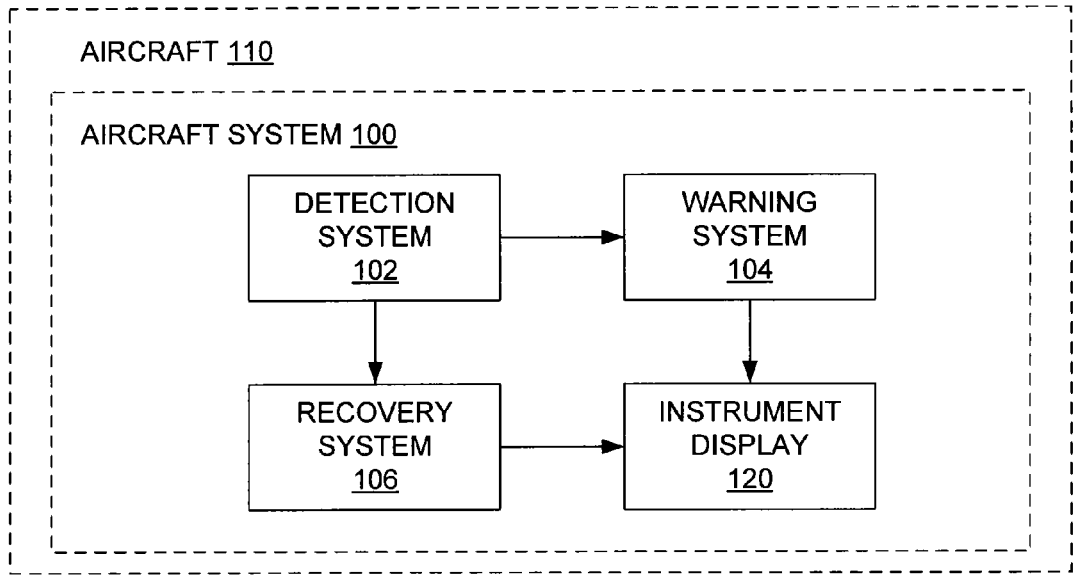
FIG. 1 is a schematic diagram depicting an exemplary embodiment of an aircraft attitude system.

Aircraft attitude systems and related methods are provided, several exemplary embodiments of which will be described in detail. In this regard, some embodiments are designed to detect the encroachment of an aircraft into inadvertent departure from controlled flight into the regime of uncontrolled flight; warn a pilot of a pending departure, and provide the pilot with directives for recovering the aircraft to a normal flight attitude. In some embodiments, such a system can operate on a stand-alone basis. In other embodiments, such a system can be interfaced with Electronic Flight Instrumentation Systems (EFIS), Global Positioning Systems (GPS) and/or other aviation electronic display instruments.

It should be noted that there are three types of spatial disorientation: Type I (Unrecognized), Type II (Recognized) and Type III (Incapacitating).

In Type I (Unrecognized), the pilot is oblivious to his disorientation, and controls the aircraft completely in accord with and in response to a false orientation percept. The pilot may believe he is flying level while actually in a banking dive, unaware of being within just seconds from a fatal crash. Some embodiments of an aircraft attitude system can reduce the probability of Type I disorientation by alerting the pilot that the aircraft has approached defined limits (e.g., pilot defined limits) for controlled flight. In some embodiments, such a system can visually and audibly direct the pilot's positioning of the flight controls to return to a "safe" flight attitude, thereby protecting the pilot from Type I spatial disorientation.

In Type II (Recognized), the pilot may experience a conflict between what he feels the aircraft is doing and what the flight instruments show. Such confusion can cause a pilot to delay corrective action or initiate incorrect control inputs, exacerbating an already dangerous situation. Some embodiments of an aircraft attitude system can provide the pilot an instrument (e.g., an instrument independent from standard instruments) to calibrate and confirm the aircraft's actual attitude. By providing the pilot with directives for immediate aircraft attitude recovery to level flight, such a system could protect the pilot from the potentially disastrous results associated with Type II spatial disorientation.

In Type III (Incapacitating), the pilot experiences the most extreme form of disorientation stress. The pilot may be aware of the disorientation, but is mentally and physically overwhelmed to the point he is unable to successfully recover from the situation. He may freeze at the controls, or make control inputs that tend to exacerbate the situation rather than affect recovery. By providing the pilot with directives for immediate aircraft attitude recovery to level flight, some embodiments of an aircraft attitude system could reduce the flight regime in which Type III disorientation occurs.

The three Critical Recovery Steps for successfully responding to a spatial disorientation event are: Critical Recovery Step 1, in which the pilot must first recognize that he has become a victim of spatial disorientation; Critical Recovery Step 2, in which the pilot must then properly interpret the aircraft's instrumentation to determine the aircraft's attitude in order to initiate the appropriate corrective action; and, Critical Recovery Step 3, in which the pilot must then apply the correct aircraft controls to affect a recovery.

It is noted that the prior art may not embody capabilities that effectively address Critical Recovery Step 1. Without compliance with Critical Recovery Step 1, Critical Recovery Steps 2 and 3 become moot points with disastrous results. Further, prior art attitude indicator designs can contribute to pilot confusion, which results in instrument misinterpretation. Prior art inherent design flaws compromise a pilot's ability to comply with Critical Recovery Step 2. Without the certain ability to properly comply with Critical Recovery Step 2, the ability to perform Critical Recovery Step 3 is dangerously compromised.

If the pilot cannot recognize entry into the regime of spatial disorientation, or if the pilot is unable to properly interpret the aircraft's attitude as represented by instrumentation, or the pilot is unable to apply the proper control inputs to initiate a recovery, a catastrophic ending is likely assured. Failures to comply with any one of the three Critical Recovery Steps have resulted in disaster and will likely continue to do so.

In this regard, an exemplary embodiment of an aircraft attitude system is depicted in the schematic diagram of FIG. 1. As shown in FIG. 1, system 100 incorporates a detection system 102, a warning system 104 and a recovery system 106. The detection system determines a present attitude of an aircraft in which the detection system is mounted (e.g., aircraft 110). The warning system alerts a pilot when the attitude of the aircraft corresponds to at least one predefined attitude parameter from a set of predefined attitude parameters. In this embodiment, the warning system communicates with the detection system to receive information corresponding to the detected aircraft attitude, and the predefined attitude parameters including pitch, bank and yaw. The recovery system provides progressive flight control positioning directives to the pilot for returning the aircraft to a flight attitude within the predefined attitude parameters. In this embodiment, the progressive flight control positioning directives are provided via an instrument display 120.

Figure 2:
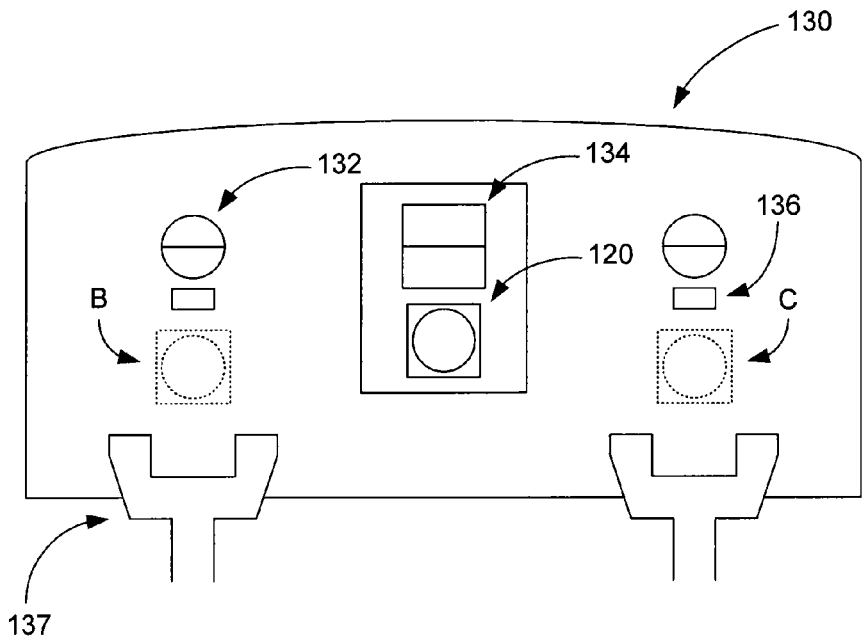
FIG. 2 is a schematic diagram depicting the embodiment of FIG. 1 implemented in an aircraft and showing the instrument display mounted to an instrument panel.

As shown in the schematic diagram of FIG. 2, instrument display 120 is located on an aircraft instrument panel 130, which provides various types of information to the pilot. By way of example, instrument panel 130 provides an artificial horizon, which is provided by a conventional attitude indicator, such as in the form of a gyro (e.g., gyro 132) and/or graphical display (e.g., display 134). Notably, the attitude indicator can incorporate a flight director, which provides navigational status information (e.g., left or right of course, above or below glideslope). It should also be noted that a flight director provides navigational status information with respect to aircraft location and in disregard of aircraft attitude. Additionally, a turn and slip indicator (e.g., indicator 136) can be provided that provides present attitude information to the pilot. Clearly, various other configurations of instruments can be used in other embodiments of an instrument panel. Note that locations B and C are presented as additional or alternative positions (among numerous others) for locating an instrument display.

Figure 3:
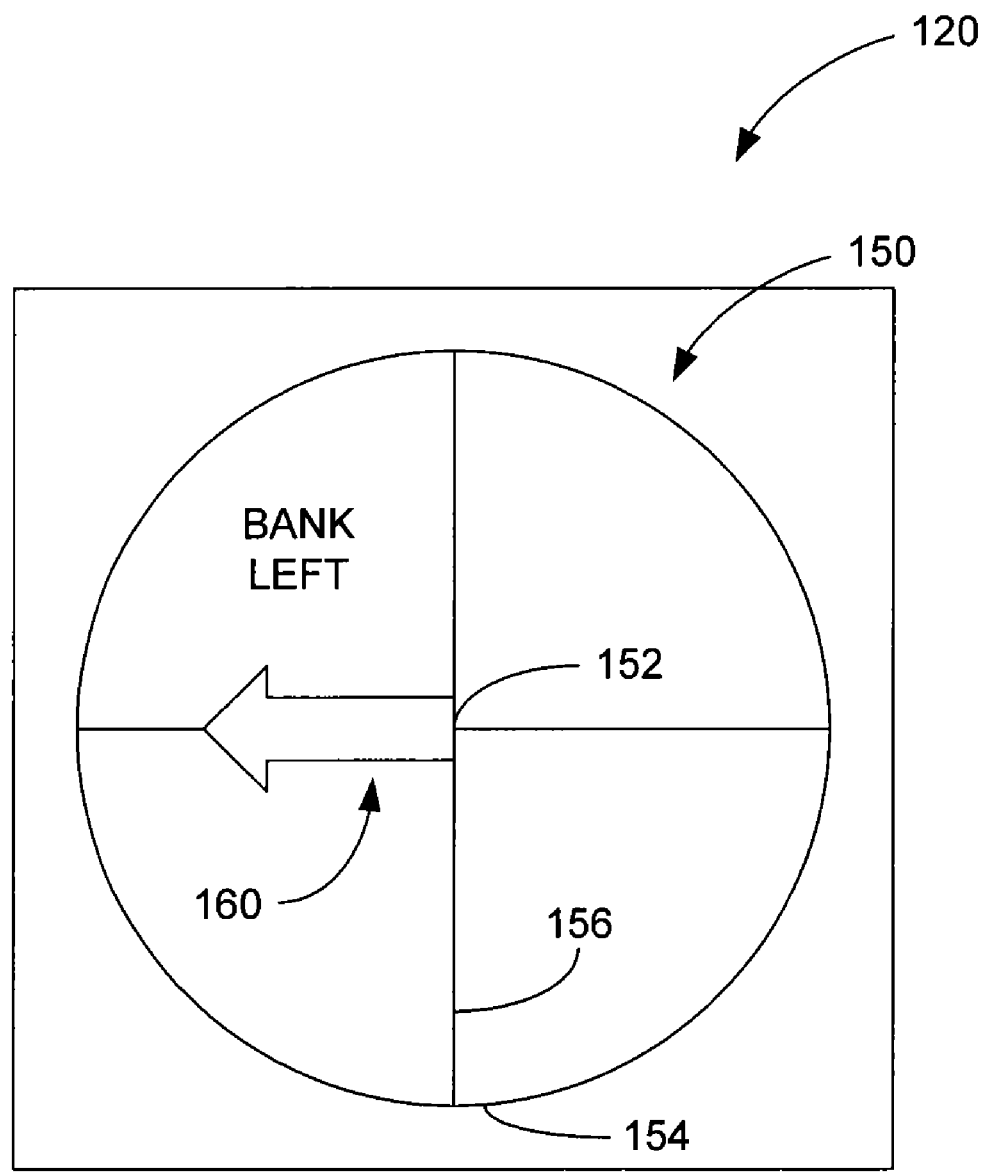
FIG. 3 is a schematic diagram depicting an exemplary embodiment of an instrument display face.

Instrument display 120 is shown in greater detail in the schematic diagram of FIG. 3. As shown in FIG. 3, display 120 provides a displayed image that includes a display field 150, which includes a center 152 and a circular periphery 154. Index markings (e.g., line 156) denote the 0°, 90°, 180° and 270° positions, with the markings extending radially from the center circle.

Instrument display 120 is used to provide information to a pilot. In particular, the information can include progressive flight control positioning directives. By way of example, display 120 is configured to display textual directives (e.g., "BANK LEFT") for informing the pilot of recommended control inputs for initiating recovery of the aircraft attitude (e.g., straight and level flight). Display 120 also is configured to display a directive arrow that informs the pilot about which flight control is recommended for actuation and which direction that flight control should be moved.

In some embodiments, an instrument display is packaged to fit into a standard 3.125" diameter instrument panel cutout while, in other embodiments, an instrument display is packaged to fit into a standard 2.250" diameter instrument panel cutouts. Clearly, other configurations can be used.

As shown in FIG. 3, directive arrow 160 indicates that the control stick or yoke (e.g., yoke 137 of FIG. 2) of the aircraft is to be moved to the left to initiate a bank to the left, as indicated by the left-pointing arrow. Similarly, a right-pointing arrow (not shown) indicates a recommendation to bank right, whereas an upward-pointing arrow (not shown) indicates a recommendation to move the control stick forward to pitch the nose of the aircraft down, and a downward-pointing arrow (not shown) indicates a recommendation to move the control stick rearward to pitch the nose of the aircraft up. As will be described later, other indicators can be used for recommending actuation of other flight controls, such as rudder pedals.

Figure 4:
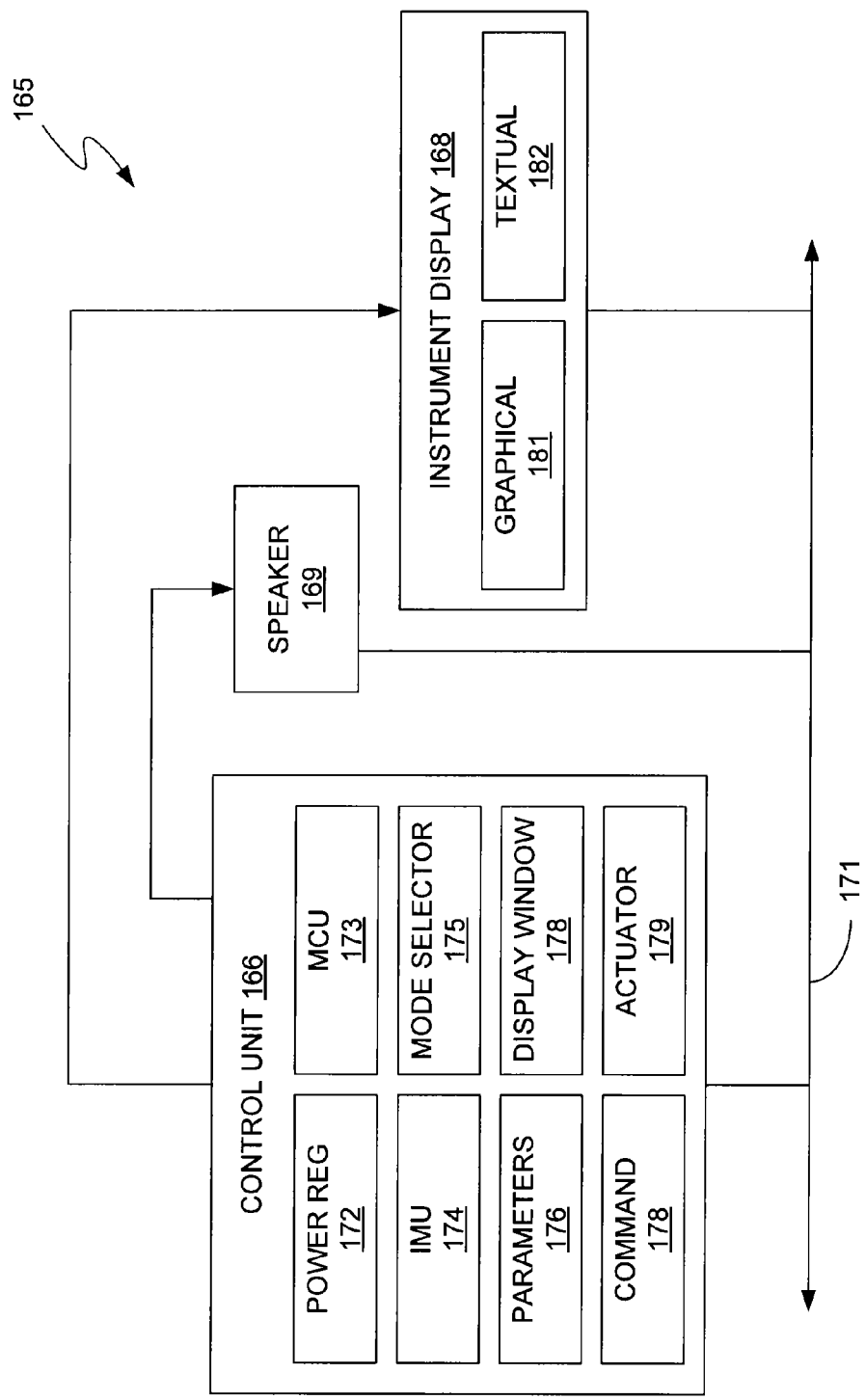
FIG. 4 is a schematic diagram depicting another exemplary embodiment of an aircraft attitude system.

In some embodiments, various functions are implemented by a control unit. The schematic diagram of FIG. 4 depicts such an embodiment. As shown in FIG. 4, system 165 includes a control unit 166, an instrument display 168 and a speaker 169 that are powered by an aircraft electrical bus 171 (e.g., 12 VDC bus). The control unit includes a power regulator 172 to insure stabilized, noise free power, a microprocessor unit (MCU) 173 and an inertial measurement unit (IMU) 174. MCU 173 performs comparative calculations of aircraft real-time attitude information as collected by IMU 174. In this embodiment, the IMU incorporates solid state 3-axis accelerometers and solid state 2-axis gyroscopes, although various other devices and combinations thereof could be used.

User input parameters 176 are entered by the pilot, are stored by the MCU and can be displayed on display window 177. Mode selector 175 determines which set of user inputs are to be sampled by the MCU and, in some embodiments, may determine which numeric indicators are displayed on the instrument display.

When the MCU compares the attitude data received from the IMU with the user input parameters and determines that the parameters have been exceeded, the MCU initiates commands (e.g., directional arrows, textual and audible) via the command module 178. As appropriate, the commands may initiate illumination of directional commands (e.g., graphical commands 181 and textual commands 182) on the instrument display. The MCU also controls enablement of audible commands (such as via a selectable actuator 179, which allows commands from the MCU to facilitate audible commands via speaker 169. Various other types of information can be provided by the instrument display in other embodiments such as information corresponding to actuation of the audible commands, directional commands corresponding to rudder pedal actuation, anticipatory commands, and parameter settings, for example.

Figure 5:
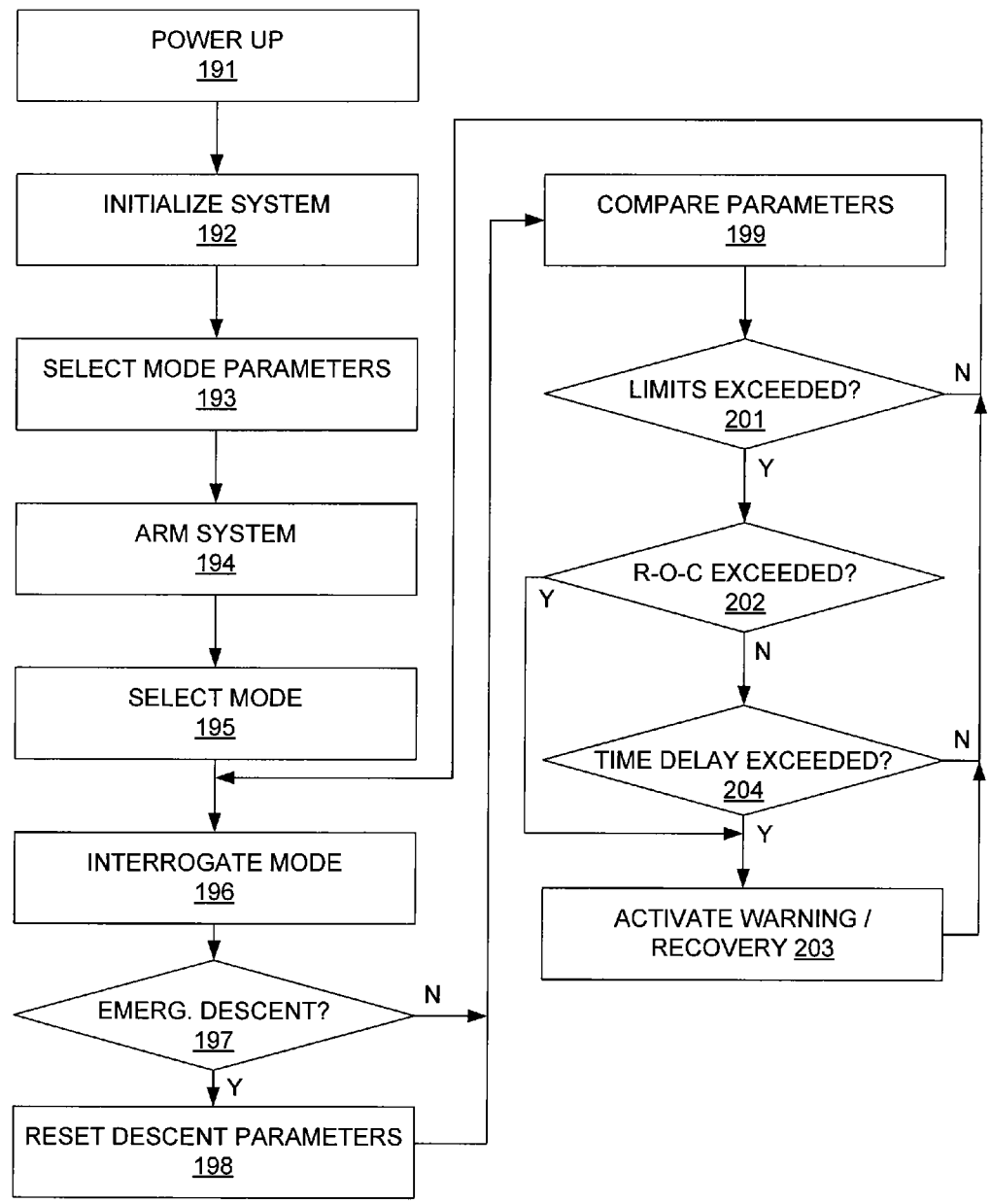
FIG. 5 is a flowchart depicting functionality of an exemplary embodiment of an aircraft attitude system.

FIG. 5 is a flowchart depicting various functions performed by the embodiment of FIG. 4. In this regard, in block 191, aircraft VDC power is applied. In block 192, the MCU initializes and performs automatic self-tests prior to testing and calibrating system components. If any component fails initial testing, if capable, the system indicates the malfunction by issuing a command "System Failure", which can include visual indicators and rendering the system nonfunctional, such as by disconnecting the system from the VDC bus.

Upon successfully completing self-tests, the system automatically defaults to the mode parameter values from the previous flight. In this embodiment, the mode defaults to "T/O" regardless of the position of the mode selector, ensuring the system is properly configured for takeoff. The "Active Mode" window also defaults to "Takeoff".

With respect to mode selection (block 193), mode selector 175 determines which set of attitude limit parameters the MCU monitors. For each mode selector position, pilot input (such as provided via a switch) is sampled. Input data is displayed on the display window 177. In some embodiments, the system can recursively check for pilot inputs for each of the selectable modes (e.g., takeoff, cruise, descent and approach) and each of the parameters (e.g., pitch up, pitch down, bank and time delay) within each mode. If values are not entered for particular attitude limit selections, default values from the last flight may be used for those selections. After the appropriate values are selected, the system then automatically arms (block 194).

Once the system is armed, the desired mode is selected (block 195). In block 196, active monitoring begins by interrogating the mode selector for the set of attitude limits to be used. If an emergency descent is requested (block 197), a system defined set of emergency descent attitude limits can be loaded into Descent Mode, overriding the previous settings (block 198). The descent mode is then automatically activated.

Regardless of the mode, the IMU and the MCU continuously check and compute aircraft attitudes and compare the results with appropriate attitude limits (block 199). If the computed attitude exceeds the predefined limits (block 201) and rate-of-change is greater than a predefined rate (e.g., 45 degrees per second) (block 202) warning and recovery systems activate (block 203). If the rate-of-change is less than the predefined rate and a timer delay limit has been exceeded (block 204) warning and recovery systems also activate. The process returns to block 197 for further updates.

Figure 6:
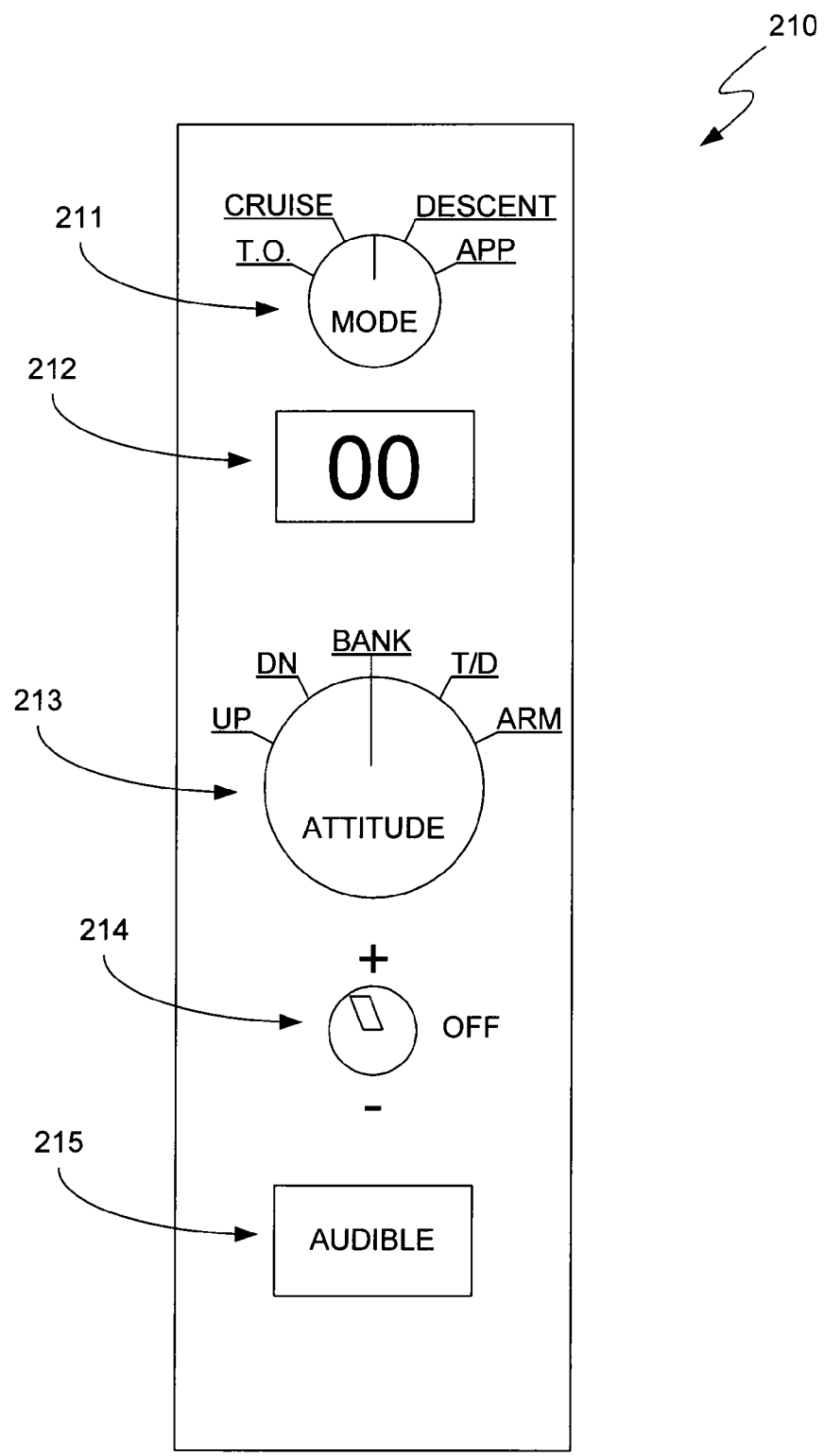
FIG. 6 is a schematic diagram depicting an exemplary embodiment of a control unit.
Figure 7:
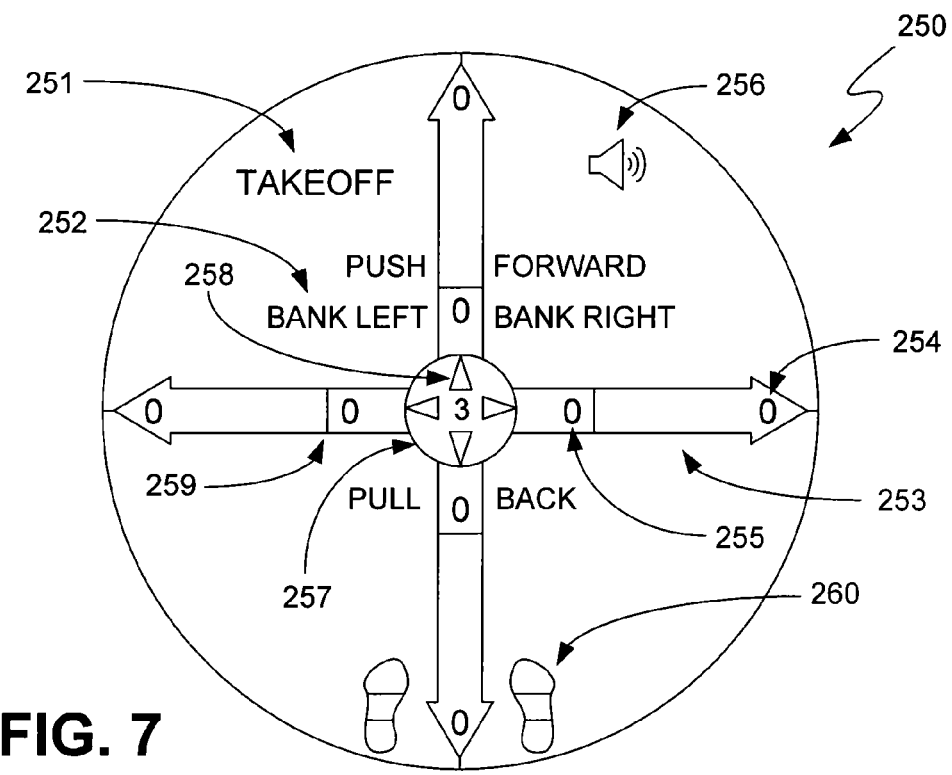
FIGS. 7-12 are schematic diagrams depicting an exemplary embodiment of an instrument display face.

Another exemplary embodiment of a control unit is depicted in the schematic diagram of FIG. 6 and a corresponding instrument display is depicted in FIG. 7.

Control unit 210 of FIG. 6 is positioned in the vertical and includes one or more of a microprocessor, sensor, timer, power supply (none of which are shown) and user interface. The user interface of control unit 210 incorporates a 4-position mode selector switch 211, a display window 212, a 5-position attitude selector switch 213, a 3-position toggle switch 214, and an audible command Off/On control button 215.

The 4-position mode selector switch 211 positions are: T/O (Takeoff), CRUISE, DESCENT and APP (Approach). The T/O (Takeoff) position enables the pilot to enter personalized takeoff pitch, bank, and time delay warning parameters via the attitude selector 213. For example, a pilot could enter a pitch down limit parameter of positive 5-degrees to alert of an inadvertent descending flight path during takeoff and climb-out if an attitude of less than 5 degrees is detected.

The CRUISE position enables the pilot to enter personalized cruise pitch, bank, and time delay parameters via the attitude selector. To transition from takeoff mode to cruise flight, the pilot simply repositions the mode selector to "CRUISE". When CRUISE is selected, pilot predefined cruise limits for pitch, bank and time delay are activated.

The DESCENT position enables the pilot override the active mode to enter personalized descent pitch, bank, and time delay warning parameters via the attitude selector. To transition from cruise mode to descent flight, the pilot simply repositions the mode selector to "DESCENT". When DESCENT is selected, pilot predefined descent limits for pitch, bank and time delay are activated.

An emergency descent capability also is provided in some embodiments. Actuating an Emergency Descent actuator can reset the system to default emergency limit parameters for activating the Descent Mode. This action overrides the previously selected mode and may override previously set personalized DESCENT limits. The system defined default limit parameters can be, for example, 0-deg pitch up, 5-deg pitch down, 5-deg bank and 2-seconds time delay. These parameters position the aircraft in a controlled nose down descent posture. This Emergency Descent capability may provide VFR pilots emergency assistance descending through IFR conditions and non-pilots emergency assistance should the pilot become incapacitated.

The APP (Approach) position enables the pilot to enter personalized approach pitch, bank, and time delay warning parameters via the attitude selector. To transition from descent mode to approach flight, the pilot simply repositions the mode selector to "APP". When APP is selected, pilot predefined approach limits for pitch, bank and time delay are activated.

Instrument approaches are flown in close proximity to the ground and demand precision course and altitude control. Therefore it is paramount the pilot be alerted promptly of possible spatial disorientation. For instance, the pilot enters a Time-Delay of zero (0) to trigger immediate activation of warning systems should an attitude excursion develop.

Mode selection may be changed at any time by simply repositioning the mode selector to the desired mode.

The display window 212 (e.g., a two digit LED display) displays pilot defined attitude limit parameters as input via toggle switch 214. The display turns on when the pilot selects either the "Pitch Up", "Pitch Down", "Bank" or "Time Delay" position on the attitude switch 213. The values for the selected attitudes remain illuminated until the attitude selector is positioned to "Armed" or the default timer automatically arms the system.

The 5-position attitude switch 213 positions are: Pitch Up, Pitch Down, Bank, Time Delay and Armed. The "Pitch Up" position turns on the LED Display, which displays in degrees the pilot defined nose up attitude the aircraft can attain before the AWARS audible and visual warning and recovery display systems activate.

The "Pitch Down" position turns on the display window, which displays in degrees the pilot defined nose down attitude that the aircraft can attain before the warning and recovery systems activate.

The "Bank" position turns on the display window, which displays in degrees the pilot defined left and right bank attitudes that the aircraft can attain before the warning and recovery systems activate. The singular defined bank limit is common to both left and right banks in this embodiment.

The "Time Delay" position turns on the display window, which displays in seconds the pilot defined time delay before the warning and recovery systems activate. The Time Delay limits are 0-5 seconds in this embodiment, although various other limits could be used. This feature tends to suppress false warnings during normal aircraft oscillations while flying through turbulent air.

The "Armed" position terminates pilot limitation defining, turns off the display window and activates warning and recovery capabilities.

In this embodiment, system maximum definable attitude limits are: Pitch Up=20 degrees, Pitch Down=15 degrees, Bank (left and right)=35 degrees. The pilot may define any attitude up to and including these respective values. However, other limits can be established in other embodiments.

If normal flight is disrupted by turbulence, or a pilot initiated evasive maneuver causing the aircraft to exceed pilot defined attitude limits within a short predefined time period (e.g., one-half second), the pilot defined time delay parameter can be over-ridden, instantly activating warning and recovery systems. Such a feature can immediately alert the pilot if the aircraft rapidly departs controlled flight. Such an event could also occur as a result of wind shear, other aircraft vortices, and clear air turbulence, among other things.

Toggle switch 214 is a three position toggle switch that increments or decrements the display window 212 for each of the first four positions of the attitude selector. Momentary actuation of the toggle to the "+" position increments the digits. The center position is "OFF". Momentary actuation to the "−" position decrements the digits.

The audible command Off/On control button 215 in this embodiment is a pushbutton switch that arms and disarms an optional voice command feature. Activating the "AUDIBLE" pushbutton switches a speaker icon of the instrument display (described later) from green to red, indicating that audible commands are disabled. Pressing the "AUDIBLE" pushbutton a second time switches the speaker icon from red to green, indicating that audible commands are enabled.

In this embodiment, when the aircraft electrical master is switched "On", the system automatically performs a self-test and presents the instrument display "Test Pattern" such as depicted in FIG. 7, such as for one minute. When the test cycle is satisfactorily completed, the Test Pattern is replaced with the "Steady State" (FIG. 8) display. Within a period of time (e.g., 60 seconds) after application of electrical power, the system defaults to each mode's parameter values from the previous flight. The mode defaults to "T/O" regardless of the position of the mode selector, attitude selector, or Audible pushbutton switch, ensuring the system is properly configured for takeoff. The "Active Mode" window also defaults to "Takeoff".

Regardless of the mode selector position, if the aircraft lands and subsequently takes off without shutting down the electrical system, and the system can detect a lack of aircraft physical movement responsive to which the system can default to T/O Mode with the prior flight's T/O Mode attitude parameter settings. Should the pilot prefer to takeoff in other than the defaulted T/O Mode, the mode selector can be cycled to any mode and returned to the mode of choice.

To modify mode settings, first select the mode to be modified, i.e., select the desired pitch, bank or time delay position using the attitude selector. Positioning the attitude selector illuminates the display window. Each attitude selector position displays the last value entered for that position and retains that value unless changed. The displayed value may be changed using the toggle switch.

After the desired attitude limit values have been entered for the selected mode, the mode selector can be repositioned to another mode for parameter modification using the same procedure.

After the modes are defined, the attitude switch is positioned to "Armed". The display window is turned off signifying the system is armed. In some embodiments, if more than a predefined period (e.g., 30 seconds) elapses between attitude entries, the system automatically arms.

When one or more pilot defined values are exceeded in flight, information in the form of progressive flight control positioning directives is provided. In the embodiment of FIG. 7, the information is provided, at least in part, by illuminated arrows that point in the direction the flight controls should be positioned to fly the aircraft's attitude towards level flight. In this embodiment, the arrow also scales, depicting the magnitude of the attitude excursion, optional equivalent numeric readouts also are displayed.

The audible command system activates when the aircraft's attitude exceeds the pilot defined attitude limits for a time period that exceeds the pilot defined time delay and will remain activated until the aircraft's attitude returns to approximately level. The "Audible" pushbutton switch temporarily disarms and rearms the audible command system.

When the pilot chooses to intentionally engage in aircraft maneuvering beyond pilot defined limits and prefers to silence audible commands, the pilot may temporarily disarm the audible warning system by depressing the Audible pushbutton. The audible command system is disabled, but system visual warning and recovery features remain armed.

The audible warning system may be rearmed at any time by depressing the Audible pushbutton switch a second time. The audible command system is automatically rearmed after the aircraft has experienced flight within the pilot defined pitch and bank attitude limits for a predefined time period (e.g., 2 minutes).

An exemplary embodiment of an instrument display is illustrated in a "Test Pattern" format, displaying all components in FIG. 7. The Test Pattern appears on the display when electrical power is applied to the aircraft and all systems self-checks have completed. The Test Pattern allows the visual confirmation that all visual components of the instrument display are operational. All fields are displayed steady-state except for the following: active mode cycles through each of the 4 modes, visual command messages cycles through each message, rudder peddles each cycle through three red segments, audible command system "System Check OK" or "Failed". Following a successful systems check, the display reverts to its "Ready State" display (FIG. 6).

As shown in FIG. 7, instrument display 250 displays an active mode 251, textual commands 252, graphical commands (e.g., warning and recovery arrows 253), numerical attitude degree indicators 254, numerical limit parameter 255, audible command system On/Off icon 256, level attitude proximity circle 257, anticipatory (e.g., red) arrowheads 258, arrow shaft 259, and rudder pedal icons 260. In some embodiments, a light dimming sensor (not shown) and remotely mounted emergency descent button (not shown) can be included.

Active mode 251 displays the present mode as selected on the associated mode selector of the control unit. The four modes displayed are: T/O (Takeoff), CRUISE, DESCENT and APP (Approach).

Visual command phrases 252 (e.g., PUSH FORWARD, PULL BACK, BANK LEFT, BANK RIGHT) are displayed whenever a pilot defined parameter is exceeded and the time delay parameter has expired. In this embodiment, the appropriate visual command phrase flashes and continues to flash until the aircraft attitude is flown to within predefined attitude limits (e.g., ±3° of bank and pitch).

Warning and recovery directive arrows 253, numerical attitude degree indicators 254, numerical limit parameter 255, level attitude proximity circle 257, anticipatory (e.g., red) arrowheads 258 and arrow shaft 259 will be described together. Four evenly spaced, outward pointing, dynamic, directive arrows 253 are provided, with the appropriate arrow illuminating whenever the pilot defined pitch and/or bank parameter has been exceeded and the time delay parameter has expired. The arrows are dynamic, extending and contracting as the attitude changes to visually illustrate the magnitude of the excursion. The illuminated arrow points either up, down, left or right.

Indicator 254 indicates the number of degrees of attitude excursion from level flight and is displayed on the tip of the corresponding directive arrow.

Each directive arrow includes three segments. The first (inner) segments form the level attitude proximity circle 257. In this embodiment, the inner segments are positioned at the center of the instrument face and form a circle that illuminates green during an attitude recovery when the attitude is within predefined limits (e.g., 3-degrees of level and/or the wings are within 3-degrees of level). Within the level attitude proximity circle 257, four anticipatory arrowheads serve two purposes. First, when displayed in horizontal or vertical pairs, they signify bank (horizontal), or pitch (vertical) is within 3-degrees of level (note that the 3-degrees used in this embodiment is displayed within circle 257). Second, when displayed singularly, it signifies the direction toward which the system anticipates directing command control input. These indicators can be displayed when a pitch or bank excursion has recovered to within pre-defined attitude limits.

The second (intermediate) segments of the directive arrows (depicted as intermediate portions of arrow shafts 259) can be green in color and can include numerical limit parameters 255 signifying the predefined attitude limits. The corresponding arrow shaft illuminates whenever the defined pitch and/or bank parameter is exceeded and the time delay parameter has expired. The length of the illuminated portion of the arrow shaft 259 correlates to the relationship between the defined parameter and the detected attitude.

The third (outermost) segments of the directive arrows (depicted as distal portions of arrow shafts 259) can be red in color and can extend and retract to indicate the relative magnitude of the attitude excursion by the length of its extension from the center of the instrument face. The length of the extension is proportional to the length of the green segment to provide the pilot an additional indication as to the magnitude of the attitude excursion. Additionally, numerical attitude degree indicators 254 representing the aircraft's present pitch or bank attitude can be displayed at the corresponding arrow tip. These two visual indicators aid the pilot in discerning how much control deflection may be required to affect a recovery.

As the aircraft attitude responds to pilot control inputs commanded by system directives, the directive arrow recedes towards the center of the instrument face at the rate of aircraft attitude correction. Simultaneously, the numerical indicator is decremented, indicating the aircraft's real-time bank or pitch attitude.

As the aircraft continues to recover toward level flight, the directive arrow continues to recede until its length coincides with that of the intermediate segment. In this embodiment, the red (distal) portion of the directive arrow disappears and the arrowhead associates with the green (intermediate) portion. The absence of the red portion of the arrow signifies that the attitude of the aircraft is now back to within the pilot defined limit. The green arrow begins displaying the real-time numerical value for the aircraft's pitch or bank attitude.

Various non-limiting examples for controlling the anticipatory arrowheads follow. In this regard, one anticipatory arrowhead displays up, down, left or right. This occurs when the aircraft is being recovered from an attitude whereby both pitch and bank are beyond defined parameter limits. In some embodiments, the system protocol commands any bank excursion to be addressed first, then pitch. When the bank excursion recovery has progressed to green arrow status, one anticipatory arrow illuminates alerting the pilot to anticipate a subsequent control command in the direction the anticipatory arrowhead is pointing.

A second possible anticipatory arrowhead display is the illumination of two horizontally opposed arrowheads. This occurs when a pitch recovery has progress to green arrow status. The two horizontally opposed anticipatory arrowheads indicate the wings are within 3-degrees of level, confirming the aircraft is experiencing a vertical correction verses a rolling recovery.

A third possible anticipatory arrowhead display is the illumination of two vertically opposed arrowheads. This occurs when a bank recovery has progress to green arrow status. The two vertically opposed anticipatory arrowheads indicate pitch is within 3-degrees of level, confirming the aircraft is experiencing a banking correction verses a spiraling dive or climbing recovery.

Speaker icon 256 illuminates (e.g., illuminates green) when electrical power is applied to the aircraft. The icon, when green, also indicates the audible command system is enabled. The system default is "enabled" when electrical power is applied. A red speaker icon, for example, can indicate that the audible command system has been disabled using the associated control unit actuator. An enabled audible command system facilitates the use of sound in aiding warning and recovery. In some embodiments, tones, voice commands and/or combinations thereof can be used.

As mentioned previously, in some embodiments, should the aircraft attitude simultaneously exceed both pitch and bank parameters, attitude recovery protocol may respond first to the existing bank excursion. In this regard, when the audible command system is enabled, visual and audible commands can be provided for returning the aircraft's wings level attitude after which visual and audible commands can be provided for any remaining pitch adjustments necessary to return the aircraft to level flight. For example, if the aircraft's attitude excursion exceeds predefined limits for both pitch up and left bank, the right directive arrow illuminates directing the pilot to bank the aircraft right to roll the wings back towards level flight. Simultaneously, the textual command "BANK RIGHT" illuminates (e.g., and blinks) while the audible system commands "BANK RIGHT" using a voice command. The textual command, audible command and directive graphical command (red arrow) remain operative until the bank angle returns to within a value prescribed by the level attitude proximity circle.

When the bank attitude corresponds to that of the level attitude proximity circle, the red arrow at the top of the instrument display illuminates directing the pilot to position aircraft controls forward to lower the nose of the aircraft. Simultaneously, the blinking textual command "PUSH FORWARD" illuminates and the audible system commands "PUSH FORWARD". The textual command, audible command and directive graphical command (red arrow) remain operative until the pitch angle is flown to within a value prescribed by the level attitude proximity circle. The level attitude proximity circle will remain illuminated while pitch correction is being applied as long as the bank angle stays within the level attitude proximity circle parameter (in this case, 3-degrees of level). During the pitch recovery process, should bank attitude depart the level attitude proximity circle parameter, bank recovery again takes priority over pitch recovery and the appropriate bank textual and audible commands reactivate. After pitch and bank attitudes have stabilized within the level attitude proximity circle for a predefined time period (e.g., five (5) seconds), the system rearms all warning and recovery systems to previously defined parameters.

The embodiment of FIG. 7 also includes rudder pedal indicators 260. When the aircraft deviates from coordinated flight (yaws), directive commands commence with the illumination of the appropriate rudder pedal application required to correct the deviation. In this embodiment, each rudder pedal indicator includes multiple vertical segments (e.g., three segments). In operation, each segment, beginning with the bottom segment, displays red as required to indicate increasing rudder pedal pressure demands, with the default color of illumination being yellow. The red segments scale down as decreasing rudder pedal pressures are required. Audible commands also can be provided, which may increase/decrease in intensity as rudder pedal pressure requirements dictate. When the aircraft returns to coordinated flight, the audible commands may discontinue and the rudder pedal indicators can turn off. It should be noted that, in this embodiment, there are no pilot defined parameters associated with this feature, nor textual commands.

Various scenarios for aircraft attitudes will now be described with respect to a representative embodiment of an aircraft attitude system. It should be noted that, since sequences for correcting deviations in pitch and bank are similar, only sequences related to bank will be described. In some embodiments, in a scenario that involve attitude excursions with respect to multiple axes, bank typically is corrected first, followed by pitch and yaw. In other embodiments, various other techniques, such as by directing the correction of multiple axes simultaneously can be used.

Figure 8:
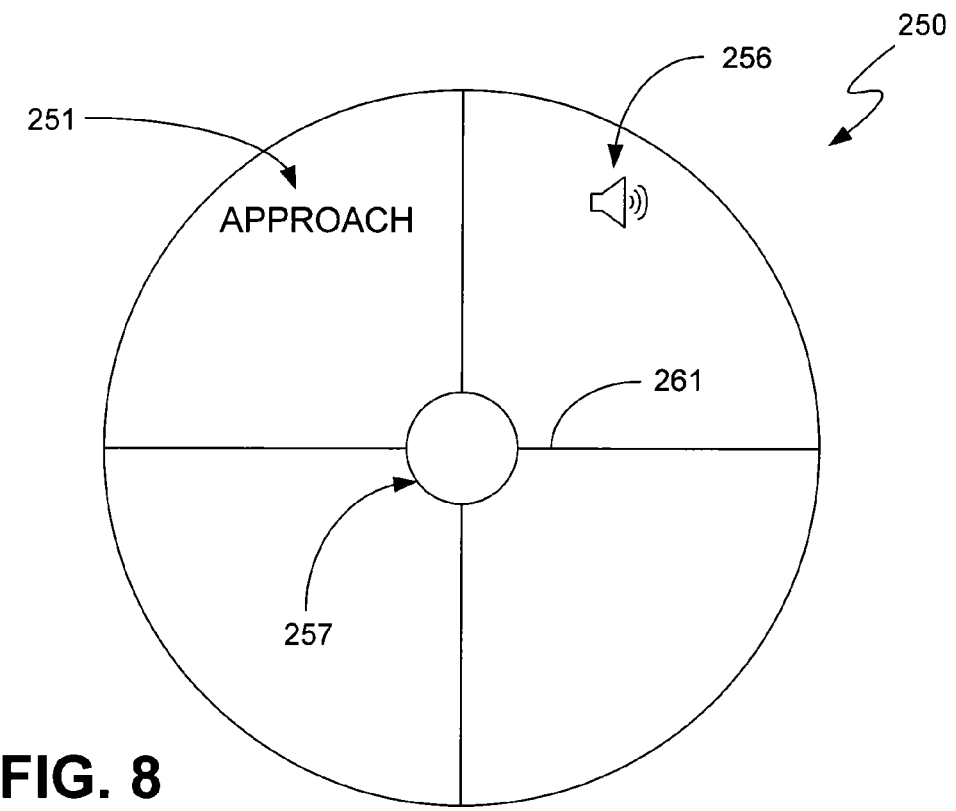

In FIG. 8, instrument display 250 displays a steady state image. In particular, the steady state image includes an indication of the active mode 251 (in this case, "APPROACH"), level attitude proximity circle 257, audible command system On/Off icon 256 and index markings (e.g., marking 261) extending outwardly from the circle 257. Notably, the steady state image is presented responsive to the aircraft attitude remaining within the parameters defined by the level attitude proximity circle (e.g., 3-degree) for a predefined time period (e.g., 2 minutes).

Figure 9:
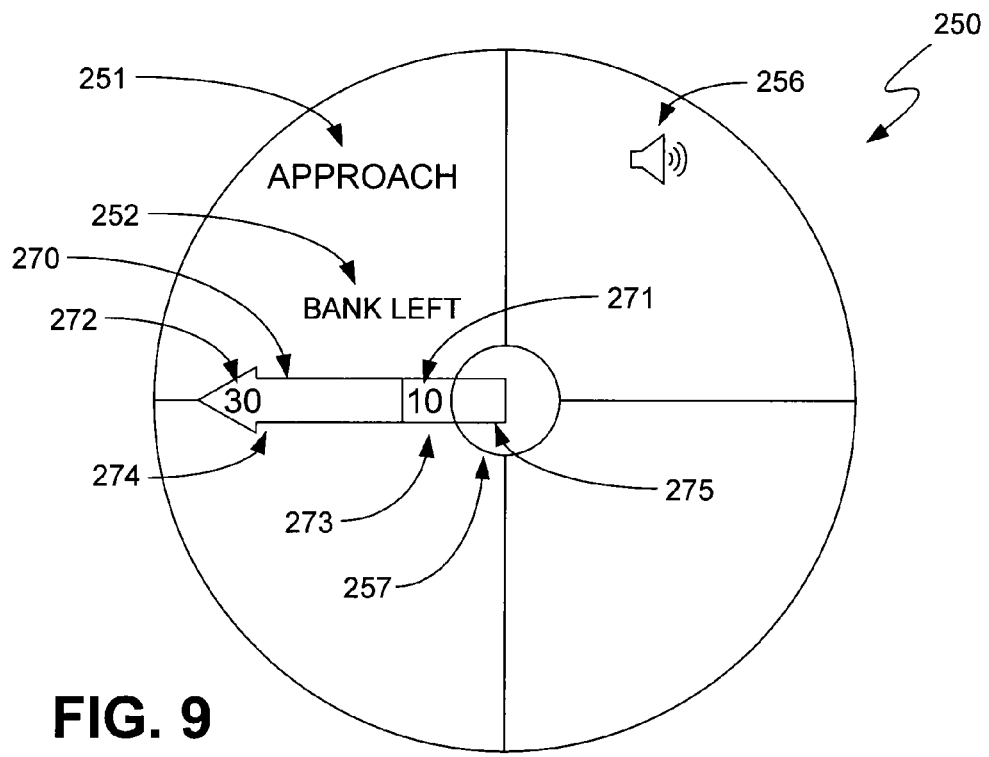

In contrast, FIG. 9 depicts the instrument display responding to an attitude excursion that involves the following: pitch=0°, bank=30° (Right), yaw=0°, with predefined parameters of Pitch UP=15° and Bank=10°. As shown in FIG. 9, directive arrow 270 indicates the direction in which the flight controls should be positioned to recover to level flight from the present attitude. The action indicated by arrow 270 is reinforced by the visual command "BANK LEFT", commanding the pilot to push the flight controls left to effect the lowering of the aircraft's left wing. Accompanying the textual command is an audible command "BANK LEFT".

All of the above are initiated when the bank attitude exceeds the predefined limit parameter, in this example, 10° of bank. The numerical limit indicator 271 displays this 10° bank parameter, whereas the numerical attitude degree indicator 272 displays the presently detected bank attitude of 30° bank.

In addition to the numerical indicators, the magnitude of the attitude excursion is presented by the segmentation and coloration of arrow 270. In this embodiment, the radially outermost portion 273 of the arrow is displayed in red and indicates the extent of the excursion beyond the predefined limit parameter. The intermediate portion 274 of the arrow is displayed in green and indicates the predefined limit parameter as a portion of the excursion. The inner portion of the arrow 275 (located within the limit circle) also is green. Thus, the red and green portions are proportional in length. In this example, the red portion of the arrow is twice the length of the green portion (the 20° excursion beyond the parameter limit is twice that of the parameter limit of 10°). It should be noted that, during operation, the arrows (e.g., arrow 270) extend and contract dynamically as aircraft attitude varies.

Figure 10:
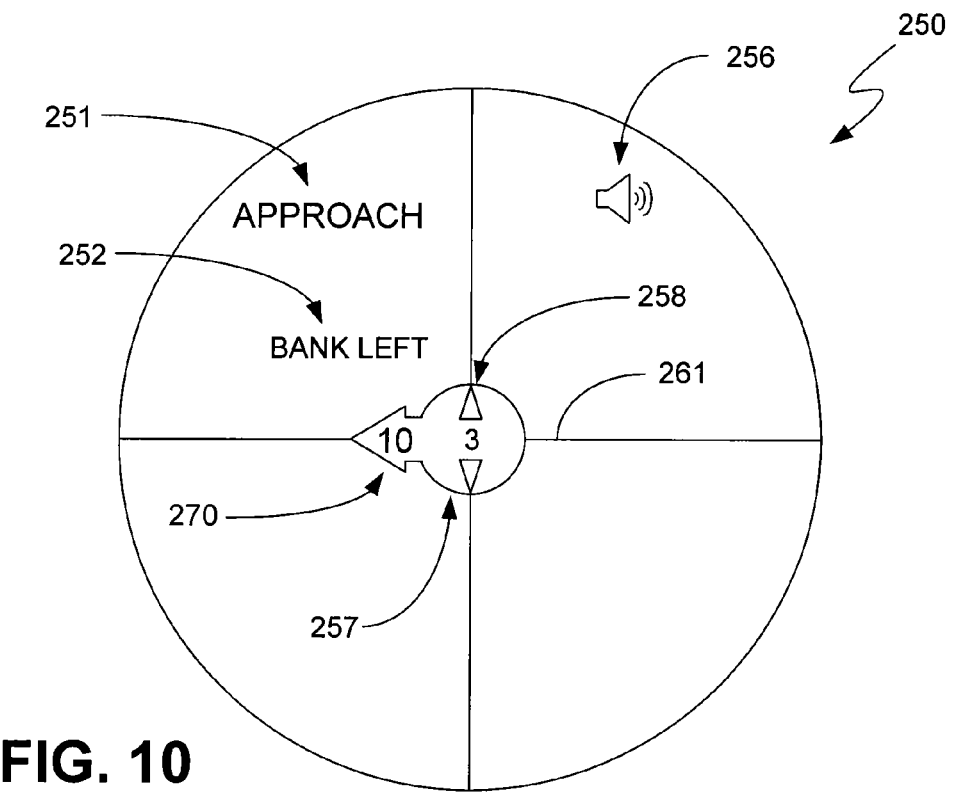

As shown in FIG. 10, responsive to the actual aircraft bank attitude corresponding to the predefined limit parameter, the arrowhead associates with the intermediate portion of the arrow and changes color (in this case, to green). The arrow continues to be dynamic, extending and contracting as the aircraft's bank varies. The arrow with arrowhead continues to be displayed until the aircraft bank attitude is returned to within that defined by the parameter circle. In this embodiment, the area defined by the parameter circle also is displayed in green while the arrow is green.

While the green arrow is ON, two arrowheads (e.g., arrowhead 258) in the parameter circle illuminate. These arrowheads signify that the pitch attitude is within predefined limits. In some embodiments, an associated audible command continues as long as the directive arrow is illuminated.

Figure 11:
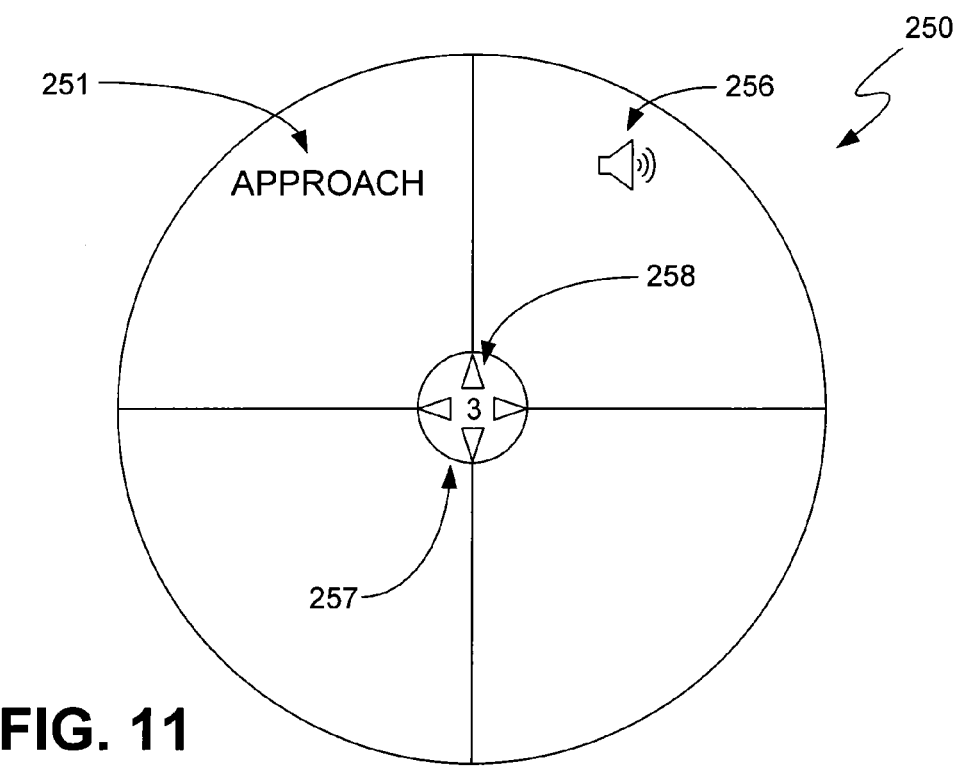

In FIG. 11, the instrument display indicates that aircraft attitude has returned to within the parameter limits defined by the parameter circle (e.g., 3° of level). Once within the parameter limits, arrow 270 is no longer displayed. Thereafter, responsive to the pitch and bank of the aircraft being within 3 degrees of level, the green arrow turns OFF, the parameter circle illuminates and the anticipatory arrowheads illuminate.

Responsive to the aircraft attitude remaining within the parameters defined by the level attitude proximity circle (e.g., 3-degree) for a predefined time period (e.g., 2 minutes), the steady state image of FIG. 8 is displayed.

Figure 12:
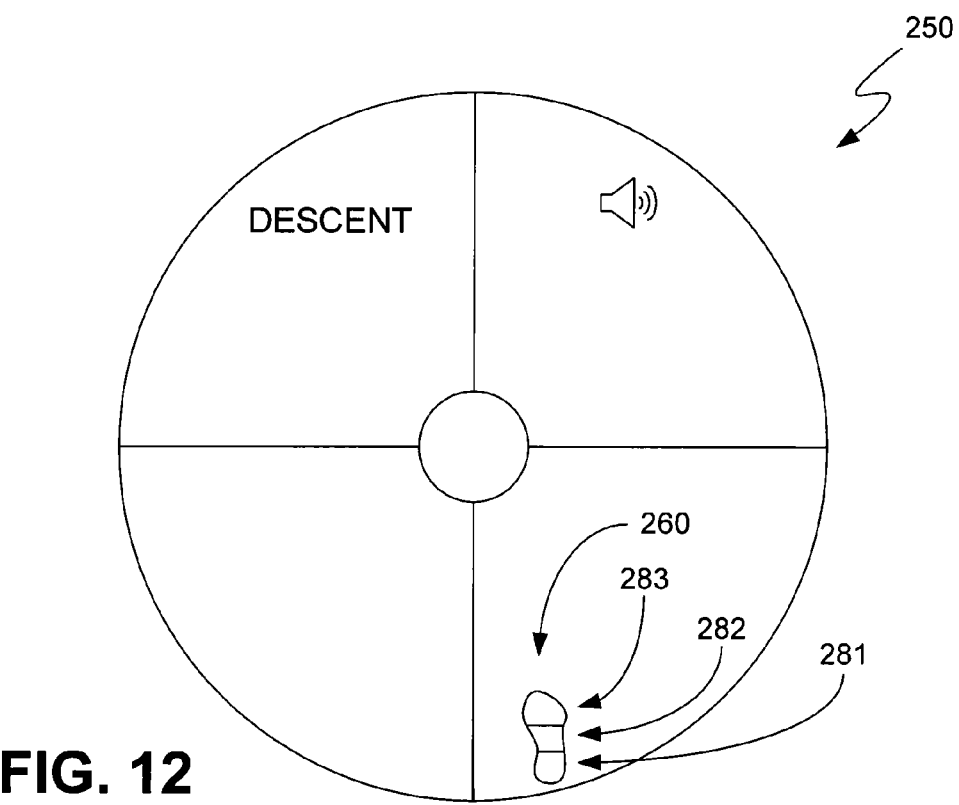

Use of the rudder pedal icons is depicted in FIG. 12. In this embodiment, a rudder pedal icon (e.g., icon 260) illuminates responsive to detecting an aircraft attitude in which yaw corresponds to predefined yaw limits. By way of example, if yaw is in excess of 1°.

In FIG. 12, the right rudder pedal icon is illuminated indicating that the aircraft is yawing to the left and that depressing of the right rudder pedal is recommended for returning the yaw to within the predefined limits. In this embodiment, note that the rudder pedal icon is divided into multiple vertical segments, which each segment corresponding to a degree of detected yaw, and consequently to a magnitude of rudder deflection recommended for returning the aircraft to within the predefined yaw limits. Specifically, the bottom segment 281 of the pedal illuminates red responsive to yaw being between approximately 2° and approximately 5°, the bottom two segments 281 and 282 illuminate red responsive to yaw being between approximately 6° and approximately 10°, and all three segments 281, 282 and 283 illuminate red responsive to yaw exceeding approximately 10°. It should be noted that in other embodiments, various other limits, numbers of segments and colors can be used.

Along with illumination of either rudder icon, the audible command system can activate, such as by providing audible commands selected from the following: for yaw between approximately 2° and approximately 5°, "PUSH LEFT RUDDER" or "PUSH RIGHT RUDDER" as appropriate; for yaw between approximately 6° and approximately 10°, "PUSH LEFT RUDDER HARD" or PUSH RIGHT RUDDER HARD" as appropriate; and for yaw exceeding approximately 10°, "PUSH LEFT RUDDER HARDER" or "PUSH RIGHT RUDDER HARDER" as appropriate.

Responsive to the aircraft attitude returning to the yaw-neutral position, the rudder icon turns OFF and the audible command system can provide a "BALL CENTERED" prompt.

Various functionality, such as that described above, can be implemented in hardware and/or software. In this regard, a computing device can be used to implement various functionality, such as that depicted in FIG. 5 and/or that provided by an IMU or MCU, for example.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure.

By way of example, helicopters currently operate with two flight hazards unique to helicopters, each possessing safety issues that are not presently adequately addressed. The first environment is vertical descent and hover. In visibly obscured environments, such as darkness or in clouds and fog, hovering can be difficult and dangerous. Helicopter pilots are not immune to spatial disorientation. In these adverse conditions, it is difficult to detect the onset of increasing sink rate while descending or hovering. Helicopters presently have two instruments to assist them—an altimeter, which lacks in vertical sensitivity, and a radar altimeter, which suffers the same deficiency. The altimeter provides no warning as to altitude changes; it only reports the present altitude. While the radar altimeter can be set to alarm at a defined altitude, it does not provide advance warning or directives to assist in maintaining or attaining a defined altitude. In this regard, some embodiments of an aircraft system are capable of detecting incremental vertical altitude movement and providing directives to address the situation.

The second environment pertains to the failure of helicopter tail rotors. Tail rotors typically fail by contact with another helicopter or gearbox failure. Either situation results in the same emergency of the helicopter losing its longitudinal stability and rotating uncontrollably around the main rotor. Should the pilot become aware of the functional loss of the tail rotor in time, he can immediately reduce the engine power and rotate semi-controlled to the surface. Typically, by the time the pilot has time to react to the event, the helicopter is well on it way to being totally out of control. In this regard, some embodiments of an aircraft system are capable of detecting lateral movement and rate thereof. In some embodiments, tail rotor failure is detected by sampling yaw rate of change and alerting the pilot via directives before his natural senses could detect the failure, thus providing additional time for the pilot to initiate the appropriate emergency procedures.

All such modifications and variations are intended to be included herein within the scope of this disclosure and protected by the accompanying claims.

We claim:

1. An aircraft attitude system for use by a pilot for warning of an aircraft departure from a desired aircraft attitude and directives for the pilot to manually return an aircraft to a desired aircraft attitude, the aircraft attitude system comprising:
   a detection system having a first accelerometer such that the first accelerometer determines a first attitude parameter of an aircraft in which the detection system is mounted;
   a user interface for receiving manual inputs corresponding to a set of pilot-selectable attitude parameters of the aircraft, the pilot-selectable attitude parameters including maximum pitch angle and maximum bank angle; and
   an instrument display having a recovery system, the recovery system receiving information corresponding to the first attitude parameter such that, responsive to the first attitude parameter of the aircraft corresponding to the first pilot-selectable attitude parameter, the recovery system provides progressive flight control positioning directives to the pilot via the instrument display for manually returning the aircraft to a flight attitude within the pilot-selectable attitude parameters;
   the instrument display displaying the progressive flight control positioning directives as arrows illuminated on the display, with a length of a first of the arrows corresponding to a magnitude of the first attitude parameter detected by the accelerometer such that a shorter length indicates a smaller angle of the first attitude parameter and a longer arrow indicates a larger angle of the first attitude parameter;
   wherein:
   the first of the arrows is displayed with an overall length corresponding to the magnitude of the first attitude parameter; and
   responsive to the attitude excursion exceeding the first pilot-selectable attitude parameter, the first of the arrows has a first segment and a second segment, the first segment extending from a base of the first of the arrows and being of a first length corresponding to the magnitude of the first pilot-selectable attitude parameter, the second segment extending from the first segment such that the pilot is presented with a visual depiction corresponding to an extent of the attitude excursion.

2. The system of claim 1, wherein the arrows are selectively displayable at 90 degree increments about the instrument display, with the arrows pointing radially outwardly from the center of the instrument display.

3. The system of claim 1, wherein a color of the arrow displayed by the instrument display indicates magnitude of an attitude excursion exceeding the first pilot-selectable attitude parameter.

4. The system of claim 1, wherein the user interface receives manual inputs corresponding to pilot-selectable attitude parameters for each of multiple phases of flight such that each of the multiple phases is associated with an independent set of the pilot-selectable attitude parameters.

5. The system of claim 4, wherein:
   a first of the multiple phases of flight corresponds to a take-off phase; and
   the pilot-selectable attitude parameters associated with the take-off phase additionally include a minimum pitch angle.

6. The system of claim 1, wherein a rate of change in length of the first of the arrows corresponds to a rate of change of the first attitude parameter of the aircraft such that the pilot is provided with a visual indication of rate of recovery from an attitude excursion.

7. The system of claim 1, wherein the first segment exhibits a first color and the second segment exhibits a second color.

8. The system of claim 7, wherein the first color is green and the second color is red.

9. The system of claim 1, wherein, responsive to the first attitude parameter indicating a right bank, the instrument display displays the first of the arrows as a left arrow.

10. The system of claim 1, wherein, responsive to the first attitude parameter indicating a left bank, the instrument display displays the first of the arrows as a right arrow.

11. The system of claim 1, wherein, responsive to the first attitude parameter indicating a nose-down pitch, the instrument display displays the first of the arrows as an up arrow.

12. The system of claim 1, wherein, responsive to the first attitude parameter indicating a nose-up pitch, the instrument display displays the first of the arrows as a down arrow.

13. The system of claim 1, further comprising a warning system having a speaker and electrically communicating with the detection system, the warning system receiving information corresponding to the first attitude parameter such that, responsive to the first attitude parameter of the aircraft corresponding to a first of the pilot-selectable attitude parameters, the warning system provides an audible warning via the speaker.

14. The system of claim 13, wherein the warning system provides a verbal warning directive via the speaker.

15. The system of claim 13, wherein the warning system alerts the pilot regarding flight attitude correspondence to at least one of the pilot-selectable attitude parameters responsive to expiration of a timing delay, the timing delay being actuated by initial correspondence of the flight attitude to the at least one of the pilot-selectable attitude parameters.

16. The system of claim 15, wherein the warning system overrides the timing delay based on a rate of change of at least one of the pilot-selectable attitude parameters corresponding to a predefined excessive rate of change such that the pilot is alerted without regard to the timing delay.

17. The system of claim 15, wherein the warning system alerts the pilot with both verbal and visual warning directives.

18. The system of claim 17, wherein the instrument display displays the visual warning directives, which comprise words corresponding to flight control inputs for the pilot to manually return the aircraft to within the pilot-selectable attitude parameters.

19. The system of claim 1, further comprising:
a processor; and
a memory having instructions stored therein, the instructions being executable by the processor to provide the progressive flight control positioning directives to the pilot via the instrument display for manually returning the aircraft to a flight attitude within the pilot-selectable attitude parameters.

* * * * *